Apr. 24, 1923.
J. W. RAPP ET AL
AIRPLANE RIB CONSTRUCTION
Filed Dec. 19, 1917
1,453,114
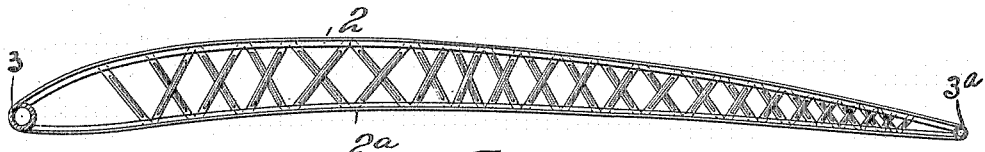
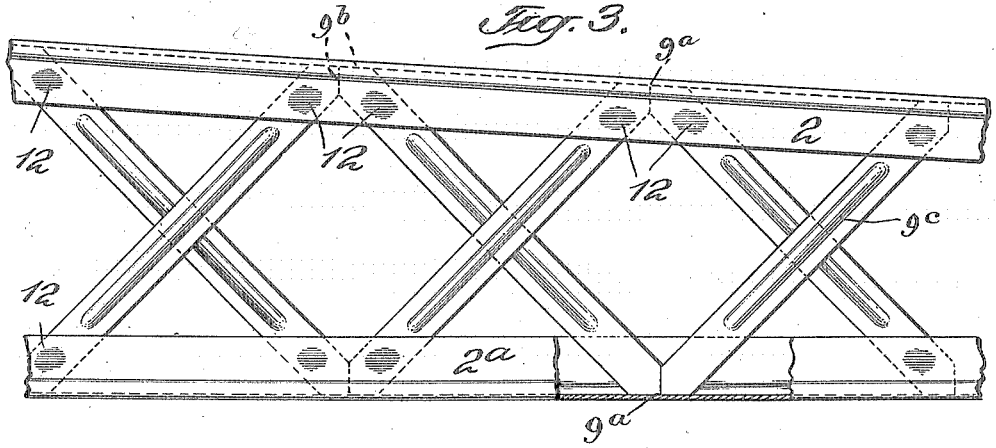
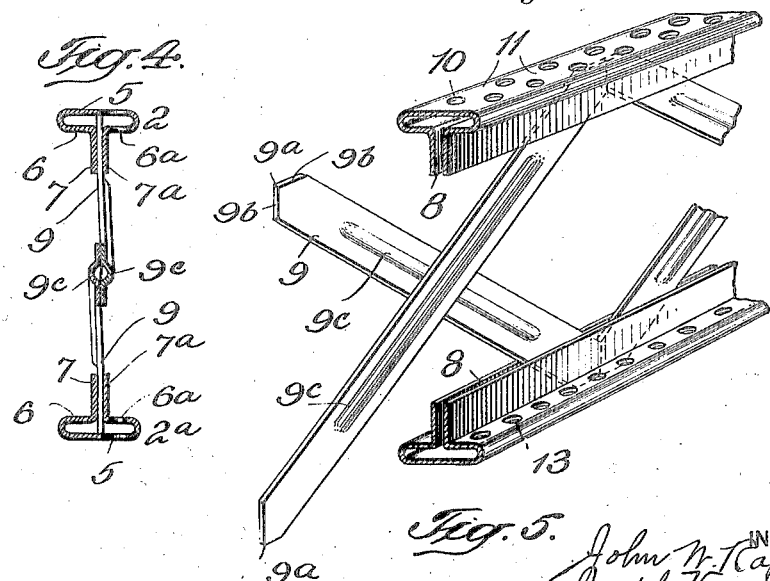
INVENTORS
John W. Rapp and
Joseph Vandrix
BY
Joseph F. O'Brien
ATTORNEY Patented Apr. 24, 1923.

1,453,114

UNITED STATES PATENT OFFICE.

JOHN W. RAPP, OF FLUSHING, AND JOSEPH VANORIO, OF BROOKLYN, NEW YORK; SAID VANORIO ASSIGNOR TO SAID RAPP; WILLIAM C. LANGE TEMPORARY ADMINISTRATOR OF SAID JOHN W. RAPP, DECEASED.

AIRPLANE-RIB CONSTRUCTION.

Application filed December 19, 1917. Serial No. 207,832.

*To all whom it may concern:*

Be it known that we, JOHN W. RAPP and JOSEPH VANORIO, both citizens of the United States, and residing at Flushing and Brooklyn, respectively, in the counties of Queens and Kings and State of New York, have invented a new and Improved Airplane-Rib Construction, of which the following specification is a full disclosure.

This invention relates to improvements in rib construction for airplane wings and the like.

The primary object of this invention is to produce a steel rib construction for airplane wings and the like which will have great rigidity and strength and will be sufficiently light in weight that it may be employed for ribs and spars in the construction of wings and other aerofoils.

In a more intense aspect, our invention comprehends the production of a rib for wings and like parts, the parts of which rib may be assembled and secured together by spot welding with great rapidity and when so assembled will have a maximum of rigidity.

In the accompanying drawings, in which similar reference characters designate corresponding parts throughout the several views, Fig. 1 is a side elevation of a rib embodying our invention;

Fig. 2 is a plan view of the rib shown in Fig. 1;

Fig. 3 is an enlarged fragmentary view in side elevation of our said rib;

Fig. 4 is a vertical section through our rib taken at any junction of the diagonal bracing members and Fig. 5 is an enlarged fragmentary view in perspective of our said rib.

Referring now to these figures, 1 indicates an airplane aerofoil rib, which has top and bottom longitudinal members 2, 2ª, each substantially T-shaped in conformation, which when the rib is in place in a wing or the like are connected to frame members 3, 3ª at the opposite marginal edges of a wing. The members 2 2ª are as shown connected together transversely by bracing members 9.

Each of the top and bottom longitudinal members 2 2ª is formed of a single strip of sheet metal bent to provide a substantially flat outer central portion 5, oppositely-disposed return portions 6, 6ª which extend inwardly toward the center line of the strip, and parallel marginal flanges 7 7ª extending at substantially right angles to the return portions and forming a seat or channel 8 between the same which is adapted to receive and retain the opposite ends of the diagonal bracing members 9 so as to permit a ready assembly and a spot-welding connection of said diagonal members to the said marginal flanges.

As illustrated, the body of the longitudinal members comprising the portions 5, 6 and 6ª is provided with perforations 10 which reduces the weight of such members and permits relatively heavy stock to be employed. These perforations are preferably arranged diagonally along the central portion 5 so as to leave diagonal bracing portions 11 of the metal between such perforations. This arrangement of the perforations while materially reducing the weight will not materially reduce the strength of the member.

Each of the diagonal members 9, as shown, has its ends oppositely beveled or its corners cut away so as to provide a central point 9ª and flat beveled edges 9ᵇ on opposite sides thereof, whereby the members 9 may be used interchangeably, and when the same are arranged as shown, one of the edges 9ᵇ will abut against the inner surface of the longitudinal members and the other edge will abut against a similar oppositely beveled edge or end of the adjacent bracing members, which, as illustrated, cross each other diagonally in single pairs so as to leave relatively large openings between the said pairs and between the top and bottom longitudinal members and also relatively large openings between the opposite portions of the members of the pair and said longitudinal top and bottom members.

Each bracing member 9 is also preferably provided with an embossed reinforcing rib 9ᶜ which extends longitudinally thereof and lends strength to the said bracing members.

In constructing the rib, the bracing members 9 are seated within the slot or seat 8 in the manner above set forth and the opposite ends are spot welded as at 12 to the flanges 7 7ª of the longitudinal members.

It is obvious that a construction of the character hereinabove described may be used for spars or other aerofoils as well as for ribs, and that when the parts are secured together will provide great strength and rigidity.

Having described our invention, we claim:

1. An aerofoil frame construction embodying marginal frame members and ribs secured in said marginal frame, each comprising top and bottom T-shaped members formed of a single strip of sheet metal perforated between its side edges and bent to provide an intermediate flat outer portion, return portions extending inwardly toward the center line of the strip and marginal flanges extending parallel to each other to form a seat therebetween; diagonal bracing members, each embossed along its longitudinal axis and arranged along the longitudinal axes of the said T-shaped members in single pairs, one member only of each pair crossing another, and having opposite ends seated within and abutting at opposite surfaces against the parallel marginal flanges of said T-shaped members and also having a connection to said parallel flanges.

2. An aerofoil frame construction embodying marginal frame members and ribs secured in said marginal frame, each comprising top and bottom T-shaped members formed of a single strip of sheet metal perforated between its side edges and bent to provide an intermediate flat outer portion, return portions extending inwardly toward the center line of the strip and marginal flanges extending parallel to each other to form a seat therebetween; diagonal bracing members, each embossed along its longitudinal axis and having its ends beveled, said bracing members being arranged in single pairs, one member only of each pair crossing another and having opposite ends seated within the said seat formed between the parallel marginal flanges of said T-shaped members with one of the bevelled edges at each end abutting against the inner surface of a longitudinal member and the other bevelled edge abutting against a bevelled edge of a member of an adjacent pair, said ends also having a permanent connection with said parallel flanges.

In witness whereof, we hereunto subscribe our names, as attested by the subscribing witness.

JOHN W. RAPP.
JOSEPH VANORIO.

Witness:
W. C. LANGE.